United States Patent [19]

Schmidt et al.

[11] Patent Number: 5,411,776
[45] Date of Patent: May 2, 1995

[54] SEALANTS

[75] Inventors: Gerald Schmidt, Worms; Rainer Jung, Ketsch, both of Germany

[73] Assignee: Morton International, Inc., Chicago, Ill.

[21] Appl. No.: 218,220

[22] Filed: Mar. 25, 1994

[30] Foreign Application Priority Data

Apr. 6, 1993 [DE] Germany .......................... 43 11 185.8

[51] Int. Cl.⁶ ...................... C08G 23/00; C08G 75/14
[52] U.S. Cl. ...................................... 428/34; 428/442; 525/535; 528/373; 528/374; 528/381; 528/388
[58] Field of Search ................ 525/535; 528/337, 374, 528/381, 388; 428/34, 442

[56] References Cited

U.S. PATENT DOCUMENTS

| | | | |
|---|---|---|---|
| 3,402,151 | 9/1968 | Kutch et al. | 260/77.5 |
| 3,402,155 | 9/1968 | Kutch et al. | 260/79 |
| 3,659,896 | 5/1972 | Smith et al. | 296/93 |
| 3,714,132 | 1/1973 | Nakanishi et al. | 260/79 |
| 3,736,301 | 5/1973 | Berenbaum et al. | 260/79 |
| 3,912,696 | 10/1975 | Doughty | 260/79.1 |
| 4,437,960 | 3/1984 | Zengel et al. | 204/181 C |
| 4,921,927 | 5/1990 | Hefner, Jr. et al. | 528/87 |

FOREIGN PATENT DOCUMENTS

| | | |
|---|---|---|
| 0502611 | 9/1992 | European Pat. Off. . |
| 1945457 | 2/1972 | Germany . |
| 2240891 | 3/1973 | Germany . |

OTHER PUBLICATIONS

Copy of European Search Report (2 pages).
Derwent Abstract 78–79590A (1 page).
Derwent Abstract 77–87294Y (1 page).
Derwent Abstract 90–326175 (1 page).
Copy of JP 02235979 (1 page).
Copy of Derwent Abstract 89–232336 (1 page).
Copy of JP 1168714 (1 page).

*Primary Examiner*—John C. Bleutge
*Assistant Examiner*—Helen F. Lee

[57] ABSTRACT

A sealant comprising a mercapto-terminal liquid oligomer containing plasticizers, fillers and additives wherein the improvement comprises as curing agent an acrylic or methacrylic compound with at least two acrylic or methacrylic groups per molecule and a guanidine derivative as a curing catalyst having good chemical and weathering stability, low water vapor permeability and long-term elasticity properties.

8 Claims, No Drawings

SEALANTS

STATE OF THE ART

Sealants based on mercapto-terminal liquid oligomers play a major role in the luting and sealing of joints and in the production of insulating glass units, as the cured polysulfide polymers show very good long-term elasticity properties, good chemical and weathering stability, and low water vapor permeabilities. The sealants used until now had the curing takes place by oxidation of the mercapto terminal groups with metal oxides or peroxides. Optimum properties with regard to elasticity are obtained by curing with manganese dioxide. Unfortunately, such sealants often show reduced adhesion in the bonding or luting of glass after UV irradiation.

In U.S. Pat. No. 3,736,301, the curing of mercapto-terminal polysulfide polymers with acrylates and amines is described. But at the same time, it is indicated that it is desirable to use co-curing agents which are oxidants which link together the uncrosslinked mercapto end groups. Only an analogous one-component system in which amine is released within several days gives a satisfactory union of the acrylic with the mercapto end groups and hence gives good physical properties of the resulting cured substance. However, such slowly curing one-component systems are not usable for industrial manufacture for instance of insulating glass for which rapid curing is necessary.

OBJECTS OF THE INVENTION

It is an object of the invention to provide fast-curing sealants which possess the same good long-term elasticity properties and stabilities as the oxidatively cured sealants on the basis of mercapto-terminal liquid oligomers, but which show no reduction of the adhesion even after intensive UV irradiation, particularly with simultaneous action of water.

It is another object of the invention to provide novel bonded glass structures.

These and other objects and advantages of the invention will become obvious from the following detailed description.

THE INVENTION

The novel sealants of the invention are comprised a mercapto-terminal liquid oligomer containing plasticizers, fillers and additives wherein the improvement comprises as curing agent an acrylic or methacrylic compound with at least two acrylic or methacrylic groups per molecule and a guanidine derivative as a curing catalyst. The sealants are particularly suitable for the production of insulating glass panes and for the bonding and luting of glass.

It has been found that the sealants based on liquid mercapto-terminal oligomers can be cured to an elastic product with the aid of acrylic or methacrylic compounds with at least two acrylic or methacrylic groups per molecule if the mixture contains as curing catalyst a substituted guanidine. The amine-catalyzed reaction of multifunctional mercapto-terminal and acrylic-terminal compounds is known per se, but for corresponding oligomers, only a jelling had been observed. For this reason, according to EP-A 0502611, epoxy resins are added to these mixtures for full cross-linking. But the addition of epoxy resins to liquid mercapto-terminal compounds leads to undesirable hard substances.

It has now been found that when reacting mixtures of mercapto and acrylic terminal compounds with amines, preferably the acrylic-terminal compounds reacted with one another which results in a jelling of the mixture. But as a part of the mercapto-terminal compounds is not bound, there is no complete crosslinking, that is, a mixture of this kind does not cure completely. While the resulting composition is solid and form-stable, it does not have satisfactory physical properties. Under slight mechanical stress, it tears cohesively and the elasticity is negligibly low.

If, however, a substituted guanidine is used as curing catalyst, there surprisingly occurs a stoichiometric addition of the mercapto groups to the acrylic groups, i.e. rapid, uniform complete curing is brought about and a co-curing agent is not necessary.

Sealant mixtures which contain liquid mercapto-terminal oligomers with at least two mercapto groups per molecule as well as plasticizers, fillers and additives can be cured to form rubber-elastic substances with good physical properties without additional curing agents, by means of acrylic or methacrylic compounds with at least two acrylic or methacrylic groups per molecule if a substituted guanidine is added as curing catalyst.

Sealants of this kind are so-called two-component sealants. One component (A) contains the liquid mercapto-terminal oligomer(s) and common plasticizers, fillers and additives. The other component (B) contains at least bifunctional acrylic or methacrylic compound(s), and possibly also plasticizers, fillers and additives, preferably a retardant. The curing catalyst can be in component A as well as in component B. Just before use, the two components are mixed together in a ratio so that there is at least one acrylic or methacrylic group per mercapto group.

By the choice of the curing catalyst, its amount and possibly a retardant, the curing can be adjusted so that the pasty substance jells with 10 seconds to several hours and then cures and depending on the acceleration, the substance has a very short processing time, desirable for application of the sealant by machine, or a so-called pot life of several hours which should be ensured for manual processing.

After curing, the pasty sealant applied on substrates adheres to substrates of different types such as concrete, stone, metal, glass and plastics, particularly PVC. Nor is the adhesion impaired even by prolonged storage in water. The adhesion on glass is especially good and is not diminished even by long and intensive UV irradiation or by UV irradiation with simultaneous storage in water.

The sealants of the invention correspond in their basic composition to formulations known per se on the basis of liquid mercapto-terminal oligomers or polymers.

Usable for the substances are all liquid polymers or oligomers or mixtures of oligomers and polymer compounds with at least two terminal mercapto groups per molecule such as polysulfide polymers, polymeric thioethers and the like. The preferred liquid mercapto-terminal compounds are polysulfide polymers and oligomers of the formula HS-(RSS)$_n$-RSH, n is an integer of 5 to 50, and R is alkyl, alkyl ether or alkylthioether.

The preferred R is a bis-ethyl-formal of the formula

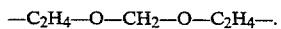

—C$_2$H$_4$—O—CH$_2$—O—C$_2$H$_4$—.

The molecular weight of these compounds is, depending on the number n and the size of R, in the range of 500 to 8000, preferably 2500 to 4000. At room temperature, these polysulfide compounds have a viscosity of 0.5 to 80 Pa.s and they have a mean crosslinkage of 0.1 to 2%. They are on the market under the designation Thiokol LP(®).

The liquid oligomers or polymers are pasted in a manner known in itself with the usual fillers and additives as well as plasticizers to form plastically deformable substances. Examples of plasticizers are phthalates, benzoic acid esters, hydrogenated terphenyls, or polyethers of high boiling point.

As inorganic fillers can be used all common, finely divided fillers, preferably carbon black, chalk, silicate, lithopon or titanium dioxide. Preferably, a mixture of various fillers in a total amount of 80 to 150 parts by weight per 100 parts of polysulfide oligomer is charged in the sealant.

To obtain sufficient stability, the sealants contain 1 to 5 parts by weight per 100 parts of polysulfide oligomer of a compacting or thixotropizing agent. Examples of such substances are highly dispersed silicic acids, bentonites, or hydrogenated castor oils.

Adjuvants are catalysts necessary for the respective curing system, accelerants or curing retardants, and possibly also adhesives, as e.g. silanes, emulsification adjuvants, drying agents or pigments. Such adjuvants which may be contained in the sealants up to 10 parts by weight per 100 parts of polysulfide oligomers, are known as are the fillers, plasticizers, chain stoppers and thixotropizing agents from sealant formulations for other areas of application.

Curing agents for the sealants of the invention are acrylic or methacrylic compounds with at least two acrylic or methacrylic groups per molecule. Suitable are acrylic acid or methacrylic acid esters of polyvalent alcohols such as glycol or diethylene glycol diacrylate or methacrylate, trimethylolpropane-di or triacrylate or methacrylate. Preferred are higher molecular weight acrylates or methacrylates, such as polyalkylene glycol acrylates or di- or poly-acrylates or methacrylates of higher molecular weight polyols.

Particularly preferred are reaction products of di- or poly-acrylates with mercapto-terminal compounds, preferably with the above-mentioned liquid mercapto-terminal polysulfide oligomers. Such products are known from EP-A 0502611 or from Polymeric Materials Science Engineering, Vol. 67 (1992), pages 415 to 418.

The quantity of curing agent in the sealant is such that there is at least one acrylic or methacrylic group per mercapto group. A slight excess of acrylic or methacrylic groups does not harm with respect to curing and it may lead to a reduction of the rubber-elastic properties of the cured sealant. It is advisable, therefore, to choose the stoichiometric ratio of mercapto to acrylic or methacrylic groups in the range of from 1:1 to 1:1.5.

In addition to the curing agent, a curing catalyst is needed. The guanidine derivatives to be used are all mono-, di-, tri- or tetra-substituted guanidines, namely both alkyl and acyl- or aryl-guanidines and substituted biguanides. Examples are methyl, dimethyl, trimethyl, tetramethyl, ethylol, acetyl, phenyl, diphenyl or triphenyl guanidine. Preferred are tetramethyl, diphenyl, or di-o-tolyl guanidine as well as o-tolyl biguanide. These are commercial products which are employed as solids or pasted with plasticizers.

They are used in an amount of from 0.05 to 2 parts by weight per 10 parts of the acrylic or methacrylic compound(s) used. Depending on the type and amount of the curing catalyst, there results gelation times in the range of from less than 10 seconds to several minutes which is quite desirable for machine methods for the application of the sealant. For manual application, processability times of several hours are desirable and they are obtained by adding a retardant.

As retardants are used carboxylic acids, preferably fatty acids, particularly stearic acid or isostearic acid, which are added in an amount of 0.1 to 1 part by weight per 10 parts of the acrylic or methacrylic compounds used.

Curing catalysts and retarding agents can be added both to component A of the sealant consisting of liquid mercapto-terminal oligomers, plasticizers, fillers and additives, as well as to component B containing the acrylate or methacrylate compound(s) and optionally plasticizers, fillers and additives. Preferably they are placed in the curing component B.

Stored separately, both components are stable for several months and after being mixed, they cure in the set curing time of some seconds up to 1 day to a rubber-elastic substance.

In the following examples, there are described several preferred embodiments to illustrate the invention. However, it should be understood that the invention is not intended to be limited to the specific embodiments. All quantities are stated in parts by weight.

The polysulfide polymer employed has the average structure $$HS-(C_2H_4-O-CH_2-O-C_2H_4-SS)_{23}-C_2H_4-O-CH_2-O-C_2H_4-SH$$

with approximately 2% crosslinkage, a mean molecular weight of 4000 and a viscosity at 27° C. of 35 to 45 Pa s (Thiokol(®) LP-2).

Acrylate I has the following structure:

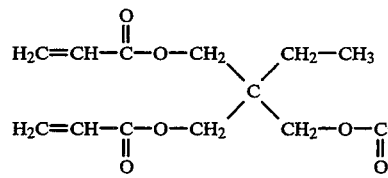 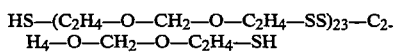 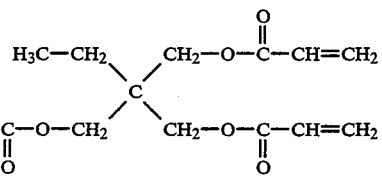

wherein R is an aliphatic chain of the average structure

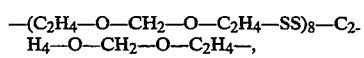

Acrylate II has the following structure:

$$H_2C=CH-\overset{O}{\overset{\|}{C}}-O+CH-CH_2-O\!\!\!\!\!+_3\overset{O}{\overset{\|}{C}}-CH_2-CH_2-S+R+S-CH_2-CH_2-\overset{O}{\overset{\|}{C}}+O-CH_2-\overset{CH_3}{\overset{|}{CH}}\!\!\!+_3O-\overset{O}{\overset{\|}{C}}-CH=CH_2$$

wherein R has the above stated meaning.

EXAMPLE 1

Component A

100 parts of polysulfide polymer were mixed in a dual shaft dissolver for 10 minutes with 40 parts of plasticizer (benzylbutyl phthalate), 48 parts of chalk, 80 parts of calcined kaolin, 30 parts of titanium dioxide and 2 parts of mercapto-terminal silane.

EXAMPLE 2

Component B was prepared by mixing 50 parts of acrylate I in a dual dissolver for 10 minutes with 15 parts of carbon black, 4 parts of plasticizer, 0.02–2 parts of curing accelerator and 0–1 parts of isostearic acid.

EXAMPLE 3

Components A and B were mixed together in a weight ratio of 200:70. When using the various curing accelerators and retardants, the following gelation times (GT) of the Table below resulted:

| Curing accelerator | Quantity | Isostearic acid Quantity | GT |
|---|---|---|---|
| — | — | — | 18 h * |
| Tetramethyl guanidine | 1 | — | 10 s |
| Tetramethyl guanidine | 0.1 | — | 20 s |
| Tetramethyl guanidine | 0.02 | — | 40 s |
| Tetramethyl guanidine | 0.1 | 0.5 | 2 min |
| Tetramethyl guanidine | 0.1 | 1 | 300 min |
| Diorthotolyl guanidine | 1 | — | 15 min |
| Diphenyl guanidine | 1 | — | 20 min |
| Diphenyl guanidine | 0.4 | — | 65 min |
| Diphenyl guanidine | 0.4 | 0.5 | 400 min |
| Cycloaliphatic amine (Epikure ®) | 2 | — | 40 s * |
| Tris[dimethylaminomethyl] phenol | 2 | — | 15 min * |
| Triethylene tetramine | 2 | — | 30 s * |

* In these experiments, a gelation did take place, but not a complete curing of the mixture. The cured products contained large proportions of uncrosslinked polysulfide polymer.

EXAMPLE 4

Component A from Example 1 and Component B from Example 2 with 2 parts of diorthotolyl guanidine as curing catalyst and 0.5 part of isostearic acid were mixed together in a weight ratio 200:70 and injected within the pot life to test pieces with a size 50×12×12 mm between glass plates of a size 75×24×5 mm. After 24 hours, the test pieces were completely cured and they were subjected to UV irradiation with simultaneous storage in water according to ISO 11431. After irradiation for 500 hours, the adhesion was still satisfactory. The test pieces tear cohesively in a stretch test at a stretch by 75%.

EXAMPLE 5

Analogous to Examples 1 and 2, the components C and D were prepared:

Component C: 100 parts of polysulfide polymer, 50 parts of benzylbutyl phthalate, 198 parts of chalk and 2 parts of orthotolyl biguanide (50% in plasticizer)

Component D: 10 parts of acrylate I, 72 parts of acrylate II, 2 parts of carbon black and 85 parts of chalk.

Components C and D were mixed together in a weight ratio 100:48 and cured at room temperature. The processability time was 90 minutes and the curing time was <18 hours.

| Shore A hardness | |
|---|---|
| after 1 day: | 12 |
| after 2 days: | 18 |
| after 3 days: | 20 |
| after 10 days: | 20 |

Test pieces were produced with the substances analogous to Example 4 and tested after the curing:

| Modulus of elasticity at 100% stretch: | 0.27 MPa |
|---|---|
| Max. modulus: | 0.37 MPa |
| Max. stretchability: | 250% |

After 500 hours of UV irradiation with simultaneous storage in water, the adhesion was still satisfactory.

Various modifications of the compositions and articles of the invention may be made without departing from the spirit or scope thereof and it is to be understood that the invention is intended to be limited only as defined in the appended claims.

What is claimed is:

1. A sealant comprising a mercapto-terminal liquid oligomer containing plasticizers, fillers and additives wherein the improvement comprises as curing agent an acrylic or methacrylic compound with at least two acrylic or methacrylic groups per molecule and a guanidine derivative as a curing catalyst.

2. A sealant of claim 1 wherein the curing agent is a reaction product of a liquid, mercapto-terminal oligomer and a di- or poly- acrylate or methacrylate.

3. A sealant of claim 1 wherein the guanidine derivative is selected from the group consisting of tetramethyl guanidine, diphenylguanidine, di-o-tolylguanidine and O-tolyl biguanide.

4. A sealant of claim 1 further containing a carboxylic acid retardant.

5. A sealant of claim 4 wherein the retardant is a fatty acid.

6. A sealant of claim 5 wherein the fatty acid is stearic acid or isostearic acid.

7. Insulating glass panes with a sealant of claim 1 sealing the glass panes.

8. A plurality of glass panes bonded with a sealant of claim 1.

* * * * *